US009109161B2

(12) United States Patent
Becker et al.

(10) Patent No.: US 9,109,161 B2
(45) Date of Patent: Aug. 18, 2015

(54) ILLUMINANT AND LIGHT SOURCE CONTAINING THE SAME, AND METHOD FOR PRODUCING SAID ILLUMINANT

(75) Inventors: Daniel Becker, Augsburg (DE); Tim Fiedler, München (DE); Wolfram Hempel, Leutenbach (DE); Frank Jermann, Königsbrunn (DE)

(73) Assignee: OSRAM Geseilschaft mit beschrankter Haftung, Munich (DE)

( * ) Notice: Subject to any disclaimer, the term of this patent is extended or adjusted under 35 U.S.C. 154(b) by 409 days.

(21) Appl. No.: 12/279,645

(22) PCT Filed: Feb. 19, 2007

(86) PCT No.: PCT/EP2007/051569
§ 371 (c)(1),
(2), (4) Date: Aug. 15, 2008

(87) PCT Pub. No.: WO2007/096333
PCT Pub. Date: Aug. 30, 2007

(65) Prior Publication Data
US 2009/0050846 A1 Feb. 26, 2009

(30) Foreign Application Priority Data
Feb. 22, 2006 (DE) .......................... 10 2006 008 300

(51) Int. Cl.
*C09K 11/77* (2006.01)
*C09K 11/08* (2006.01)

(52) U.S. Cl.
CPC ......... *C09K 11/7734* (2013.01); *C09K 11/0883* (2013.01); *Y02B 20/181* (2013.01)

(58) Field of Classification Search
CPC .................................................. C09K 11/7734
USPC .................................................. 252/301.4 F
See application file for complete search history.

(56) References Cited

U.S. PATENT DOCUMENTS

| 6,717,353 | B1 | 4/2004 | Mueller et al. | |
|---|---|---|---|---|
| 7,061,024 | B2 * | 6/2006 | Schmidt et al. | 257/98 |
| 7,550,095 | B2 * | 6/2009 | Fiedler et al. | 252/301.4 F |
| 7,649,309 | B2 * | 1/2010 | Fiedler et al. | 313/503 |
| 7,723,740 | B2 * | 5/2010 | Takashima et al. | 257/98 |
| 7,794,624 | B2 * | 9/2010 | Tamaki et al. | 252/301.4 F |

(Continued)

FOREIGN PATENT DOCUMENTS

| EP | 1 413 618 | 4/2004 |
|---|---|---|
| EP | 1 571 194 | 9/2005 |

(Continued)

OTHER PUBLICATIONS

H.T. Hintzen et al., "Luminescence properties of Eu2+ activated alkaline-earth silicon-oxynitride Msi2O2-dN2+2/3d (M=Ca, Sr, Ba): a promising class of novel LED conversion phosphors", Chem. Mater., vol. 17, pp. 3242-3248, 2005.

*Primary Examiner* — Matthew E Hoban
(74) *Attorney, Agent, or Firm* — Cozen O'Connor

(57) ABSTRACT

An illumination from the class of oxynitridosilicates, doped with bivalent europium and comprising a cation M2+, said illuminant corresponding to the basic formula $M_{(1-c)}Si_2O_2N_2$: $D_c$ wherein the following holds good: $M=Sr_{(1-x)}Ba_x$ mit $0.3<x<0.7$.

4 Claims, 13 Drawing Sheets

(56) References Cited

U.S. PATENT DOCUMENTS

| | | | | |
|---|---|---|---|---|
| 7,897,064 | B2 * | 3/2011 | Shioi | 252/301.4 F |
| 2006/0076883 | A1 * | 4/2006 | Himaki et al. | 313/503 |

FOREIGN PATENT DOCUMENTS

| | | | |
|---|---|---|---|
| JP | 2004-134805 | | 4/2004 |
| JP | 2004-189996 | | 7/2004 |
| JP | 2004-189997 | | 7/2004 |
| JP | 2004-210921 | | 7/2004 |
| JP | 2004-277547 | | 10/2004 |
| WO | WO2004/039915 | * | 5/2004 |
| WO | WO 2005/030903 | | 4/2005 |
| WO | WO2005/030905 | * | 4/2005 |
| WO | WO 2005/030905 | | 4/2005 |
| WO | WO 2005/031797 | | 4/2005 |
| WO | WO 2006/028264 | | 3/2006 |
| WO | WO 2006/087660 | | 8/2006 |

* cited by examiner

ILLUMINANT AND LIGHT SOURCE CONTAINING THE SAME, AND METHOD FOR PRODUCING SAID ILLUMINANT

RELATED APPLICATIONS

This is a U.S. national stage of application No. PCT/EP2007/051569, filed on Feb. 19, 2007.

This application claims the priority of German patent application no. 10 2006 008 300.8 filed Feb. 22, 2006, the content of which is hereby incorporated by reference.

FIELD OF THE INVENTION

The invention is based on an oxynitride phosphor and also relates to a light source, in particular an LED, with such a phosphor. The phosphor belongs to the class of sions. The invention also relates to a production process for such a phosphor.

BACKGROUND OF THE INVENTION

WO-A 2005/030905 describes a phosphor and a production process for a mixed sion, which represents an oxynitridosilicate of the formula $MSi_2O_2N_2$ (M=Ca, Sr, Ba) which is activated by divalent Eu, possibly with the further addition of Mn as coactivator, with the HT phase forming the majority or all of the phosphor, i.e. more than 50% of the phosphor, preferably more than 85% of the phosphor. This HT modification is distinguished from the LT phase by the fact that it can be excited within a broad band, namely in a wide range of from 50 to 480 nm, in particular from 150 to 480 nm, particularly preferably of from 250 to 470 nm, that it is extremely stable with respect to external influences, i.e. does not demonstrate any measurable degradation at 150° C. in air and that it has an extremely good color locus stability under fluctuating conditions. Further plus points include its low absorption in the red, which is particularly advantageous in the case of phosphor mixtures. A majority of the HT modification can be identified, inter alia, from the fact that the characterizing peak of the LT modification in the XRD spectrum at approximately 28.2° has an intensity of less than 1:1, preferably less than 1:2, in comparison with the peak with the highest intensity from the group of three reflections of the HT modification which lie in the XRD spectrum at from 25 to 27°.

WO-A 2004/039915 discloses a phosphor and a light source with a crystal structure in the orthorhombic system. The sion has the stoichiometry $MSi_2O_2N_2:Eu$. It is, for example, a mixed sion with M=(Sr, Ba), where preferably the molar ratio of Sr:Ba is 6:4 to 9:1.

SUMMARY OF THE INVENTION

One object of the present invention is to provide a high efficiency phosphor having an efficiency is as high as possible. A further object is to provide a light source with this phosphor and a process for producing this effective phosphor.

Until now, there has been no yellow-emitting phosphor with a high efficiency which is at the same time insensitive to external influences and in addition can be easily excited by blue or UV radiation, in particular by primary radiation of LEDs. Since the phosphor according to the invention can be easily excited by both blue and UV radiation, it is also suitable for other light sources in which excitation in this spectral region is possible, such as, for example, Hg low-pressure fluorescent lamps, as a shifting pigment in connection with blue/green electroluminescent phosphors or else in connection with lamps which use molecular radiation of metal iodides such as indium iodide.

The starting point of the novel invention is the surprising knowledge that there is a further phase of the sion phosphor which only occurs in the mixture between Sr/Ba, but not in the pure Sr sion and Ba sion. It behaves differently and displays different XRD reflections than the previously known sions. The characterizing feature of this new phase is the fact that the dominant wavelength is not, as actually to be expected, between that of the Sr sion and that of the Ba sion, based on a given Eu doping content, but surprisingly has a markedly longer wavelength than the dominant wavelength of the corresponding Sr sion, namely is shifted towards longer wavelengths by at least 6=m. A shift of from 8 to 10 nm is typical. The phase can be represented as $M_{1-c}Si2O2N2:Eu_c$ where $M=Sr_{1-x}Ba_x$.

Preferably, the mixed sion is selected in such a way that $0.42 \leq x \leq 0.70$, in particular $0.45 \leq x \leq 0.55$.

In this case, the best results are achieved with a relatively high content of the dopant. As a rule, the activating dopant is exclusively or very predominantly europium. The content c of the Eu should make up between 0.1 and 20 mol % of M, preferably from 5 to 12 mol %.

The novel phosphor is characterized in the X-ray diffraction diffractogram (XRD spectrum) by a completely different reflection pattern than the known sions. It is not ruled out here that other metals in smaller amounts also build up an at least ternary compound for the host lattice of the mixed sion, which metals contain, apart from Sr and Ba, also other divalent metal ions, in particular Ca, Mg, Zn and Mn. These demonstrate a similar structure to the novel mixed sion, which can be identified by the similar reflections of the X-ray diffraction diffractogram.

It is noticeable that the reflection with the greatest intensity of the novel phosphor is a double peak, which is shifted towards shorter angles in comparison with the XRD reflection with the greatest intensity of Sr sion, which, when excited by Cu Kα, is approximately 31.6°. In this case, at a high resolution there is a double peak with maxima at approximately 29.8 and 31.3°. It is also noticeable, inter alia, that a group of three reflections occurs in the X-ray diffraction diffractogram between 52° and 58° which are not present in the case of normal sions.

A possible cause of the occurrence of the new phase, given a suitable production process, is the careful selection of the mean ion size of the ion $M^{2+}$. As soon at the mean ion radius falls below a critical variable, a blue band, which, as discussed above, is emitted by the pure Ba sion phase, disappears virtually completely. This can preferably be achieved by changing the Ba/Sr ratio in a targeted manner.

For example, in the case of a mean ion radius of the ion M2+ of at most 0.13 nm, this completely new phase forms, and this phase is present thus in binary form obviously only in the mixed sion comprising Sr and Ba. It has a different emission spectrum in which the blue band is irrelevant. In this phase, the position of the emission band is very highly dependent on the doping content. As the content of Eu increases, the emission is shifted noticeably in long wave fashion.

The new phase can be produced, for example, in accordance with the following procedure:

The carbonates of the metals M, in particular the carbonates of Sr and Ba, are used. They are mixed with $SiO2$, $Si3N4$, $Eu2O3$. The use of a halide-containing flux such as in particular $SrF2$, $BaF2$, $SrCl2$ or $NH4F$ or $NH4HF2$ has proven successful. In addition, in particular also boric acid $H3BO3$ or another conventional flux can be used as the flux. It is naturally also possible for suitable mixtures of various fluxes to be used. These batch mixtures react under heating to 1350° C. to 1650° C., in particular at least 1450° C., in a slightly reducing atmosphere, which preferably contains at least one of the components such as Ar, N2, H2 or forming gas (N2/H2). It is critical here that the Sr and Ba precursors are mixed sufficiently well. Depending on the batch mixture, washing may also be recommendable so as to in particular improve the purity of the product.

Fluxes generally allow for improved growth of the crystallites and therefore increase the quantum efficiency and the absorption of the phosphor at the excitation wavelength. It is possible that, as is also the case for other phosphors, very low quantities of the flux (in particular of the small F, Cl and B ions which, as is known, are the active part of the flux) remain in the phosphor.

Washing, preferably at a pH value<8, after the annealing can help to remove water-soluble foreign phases (for example orthosilicate phases) and flux residues which may be present in small amounts and therefore improve the phosphor quality.

Another production route which is less sensitive in terms of the mixing of the Sr and Ba precursors uses orthosilicates.

The XRD lines of the new phase can be indexed orthorhombically. The new phase cannot be assigned to a known phase, however. An investigation into the cell volume under this assumption provides surprising results, however. When matching the lattice parameters to the measured diffractograms under the assumption of the orthorhombic unit cell, it is demonstrated that the cell volume curiously markedly decreases at first with the increase in Ba content, although with $Ba^{2+}$ a larger cation is replaced by the smaller $Sr^{2+}$. In the region of from 30 to 58 mol % of Ba, the apparent cell volume then barely changes, and subsequently increases again. The simplest way of explaining this is by the fact that the selected unit cell does not actually correspond to the physically relevant unit cell. Independently of this, it is clear, however, that, given suitable production, three regions result in the mixed sion (Sr, Ba) sion which can be clearly distinguished from one another. A first region is the known Sr-dominated mixed sion (Sr content of approximately 70 to 100%), a second region is the known Ba-dominated mixed sion (Ba content of approximately 70 to 100%). The new phase of a genuine mixed sion occurs in the case of suitably selected production conditions in the region of a 30 to 70% Sr content, with the remainder being Ba. The new phase is particularly well pronounced in the region of from 30 to 58 mol % of Ba, primarily at from 45 to 55 mol % of Ba.

The new phase is also maintained if small quantities of other divalent ions are added. When Ca is added, the possible Ba content is shifted towards higher contents.

The discovery of a new phase is supported by the fact that pure Sr sion emits green and pure Ba sion emits at an even shorter wavelength, namely blue-green. On the other hand, the new mixed sion emits yellow, i.e. at a longer wavelength than pure Sr sion.

For applications in white LEDs, typically an Eu content of from 5 to 20% is selected, with the result that the dominant wavelength of the phosphor is in the yellow spectral region at at least 569 nm. A value of c=0.1 is typical, i.e. an Eu content of 10% in M. This corresponds to a dominant wavelength of approximately 573 nm.

As a result, the known yellow garnet phosphor YAG:Ce can be replaced by a novel oxynitride phosphor $Sr_{1-x}Ba_xSi_2O_2N_2$:Eu where $0.7 \geq x \geq 0.3$, for yellow emission. This phosphor, in the composition with x of around 0.5 and 10% Eu doping, has approximately the same dominant wavelength as alternative yellow phosphors (garnets, orthosilicates). The phosphor whose emission band is surprisingly not between blue-green ($BaSi_2O_2N_2$:Eu) and yellow-green ($SrSi_2O_2N_2$:Eu), but whose wavelength is shifted in long-wave fashion into the yellow in comparison with the two compounds has two important advantages over the prior art, as it is characterized by the use of garnet phosphors (orthosilicates are much more inefficient than YAG:Ce):

Firstly, the useful visual effect is 10-15% higher, depending on the compound, than in the case of comparable garnet phosphors. And secondly, the conversion efficiency loss at 150° C. is reduced from at least 20% in the case of garnet phosphors to approximately 7%.

The potential efficiency advantage in the case of a white LED (color locuc x/y=0.33/0.33) on the basis of the novel phosphor and a 455 nm primary LED at 150° C. is therefore approximately +20% in comparison with a YAG:Ce-based solution (x/y=0.32/0.33). The efficiency advantage is increased at shorter excitation wavelengths since the conversion efficiency increases in comparison with YAG.

Surprisingly, the X-ray diffraction diffractogram and therefore the structure of SrBa sion does not correspond to that of the Ba sion or that of the Sr sion. In the case of SrBa sion, significantly fewer lines are observed in the X-ray diffraction diffractogram than in the case of Sr sion, which proves that this is a new phase with greater symmetry.

As a result of the ever increasing powers of the LEDs and ever wider application areas, in the future LED temperatures (junction temperatures) of over 150° C. will be reached. At these high temperatures, in the case of the yellow garnet phosphors such as YAG:Ce which until now have been the most efficient, a noticeable thermal quenching of the luminescence already also occurs. They lose at least 20% of their conversion efficiency in comparison with the efficiency at room temperature. Until now, the LED temperature was kept at temperatures which are as low as possible by means of complex cooling measures, which in many cases are not tolerated by the market and in many applications are not possible for reasons of space. The new mixed sion in this case offers a superior solution. However, it can also be used for other light sources, for example conventional lamps such as high-pressure discharge lamps and fluorescent lamps.

The new mixed phase can also be mixed with other phases of sions, in particular Sr sion.

Particularly surprising is the fact that the new phase can be even more efficient than garnet phosphors and can therefore even replace YAG:Ce.

In order to obtain the new phase as purely as possible, a suitable production process needs to be used. In this case, the synthesis from nitrides, as has usually been applied up until now, is less recommended since nitrides cannot be produced with a particularly fine particle size. In order to achieve intimate mixing of the Sr and Ba precursors, however, it is favorable to use Sr and Ba precursors which have as fine a particle size as possible and which have a maximum d50 (measured using a sedigraph) of at most 5 μm, preferably even at most 3 μm. Favorable results are achieved with precursors which have a d50 of between 1 and 2 μm.

The simplest way is for the new sion to be produced via an orthosilicate route, but also suitably modified synthesis from carbonates is possible, in particular using a relatively high content of dopants. In particular a high Eu content of at least 1%, advantageously at least 5%, appears to favor the formation of the new phase. In particular, the radiation stability of the new mixed sion is greater than in the previously known phases.

The novel phosphor is particularly suitable for use in white LEDs. In this case, an x value for Ba of from 30 to 70% can be used, whilst at the same time using a relatively high Eu content of at least 5%. It is very well suited for excitation in the spectral region at from 440 to 465 nm, and it is particularly easy to achieve excitation by means of a peak wavelength of the LED at from 440 to 450 nm. The dominant wavelength of the phosphor can in this case be set very easily to a region of between 569 and 578 nm.

The warm-white high brightness (HB) LEDs which until now have been the most efficient are based on a combination of a garnet phosphor such as YAG:Ce and a nitridosilicate such as (Sr, Ca) 2Si5N8:Eu. When using blue LEDs with a long wavelength (~460 nm), this solution is very effective. However, it demonstrates that it is advantageous from the point of view of chip technology to transfer to shorter wavelengths (440-450 nm). At these wavelengths, the relative red phosphor content is increased and the garnet phosphors are tendentially less efficient. As a result of the increased content of the Eu2+-based red phosphors, a significant proportion of the radiation of the garnet phosphor is reabsorbed by the red phosphor, which further impairs efficiency.

Until now attempts have been made to match the garnet phosphors correspondingly, for example by partial substitution of the Al3+ ions by Ga3+ ions (YAGaG:Ce), when using LEDs at shorter wavelengths. The disadvantage of the broadband emission which is reabsorbed on the short-wave side to a great extent by the red phosphor in this case still remains, however. Other solutions, such as yellow orthosilicates or thiogallates, which emit within a very narrow band, are not possible solutions for use in HB LEDs which can reach high temperatures, as a result of the lack of thermal and chemical stability. At present there is no effective alternative to cerium-doped garnet phosphors which emit over a broad band.

The emission of the phosphor SrBa SiON:Eu has a markedly narrower band and has a higher useful visual effect than that of the garnet phosphors. In addition, the efficiency increases with decreasing LED wavelength. In contrast to orthosilicates, which has a very similar emission, the SrBa SiON:Eu is an extremely thermally stable phosphor and therefore is also best suited to use in HB LEDs. As result of the narrow-band emission of the phosphor, given the same dominant wavelength substantially less short-wave radiation is emitted in a spectral region in which the Eu2+-based red phosphors, such as for example the nitridosilicates, have a particularly high absorption. A particularly high efficiency is achieved by mixing the sion with a relatively short-wave red phosphor such as Ca2Si5N8:Eu.

Since the novel yellow phosphor SrBa sion has a very high useful visual effect in comparison with garnet phosphors with at the same time a very high conversion efficiency and in addition is only absorbed relatively weakly by Eu2+-based red phosphors, extremely efficient LEDs with low color temperatures can be realized with this phosphor in combination with red phosphors, which have a high useful visual effect, such as Ca2Si5N8:Eu or else Ca5Al4Si8N18:Eu and variants thereof. When using LEDs which emit primarily at 444 nm (peak), an extremely high efficiency of approximately 80% of the most efficient LEDs for a color temperature of 6000 K, so-called daylight white, can still be demonstrated even for a color temperature of 3200 K, so-called warm white. The most efficient solutions which have been available to date for warm white are markedly less efficient, namely of the order of magnitude of approximately 5% and more darker.

BRIEF DESCRIPTION OF THE DRAWINGS

The invention will be explained in more detail below with reference to a plurality of exemplary embodiments. In the figures.

DETAILED DESCRIPTION OF THE DRAWINGS

Figure 1:
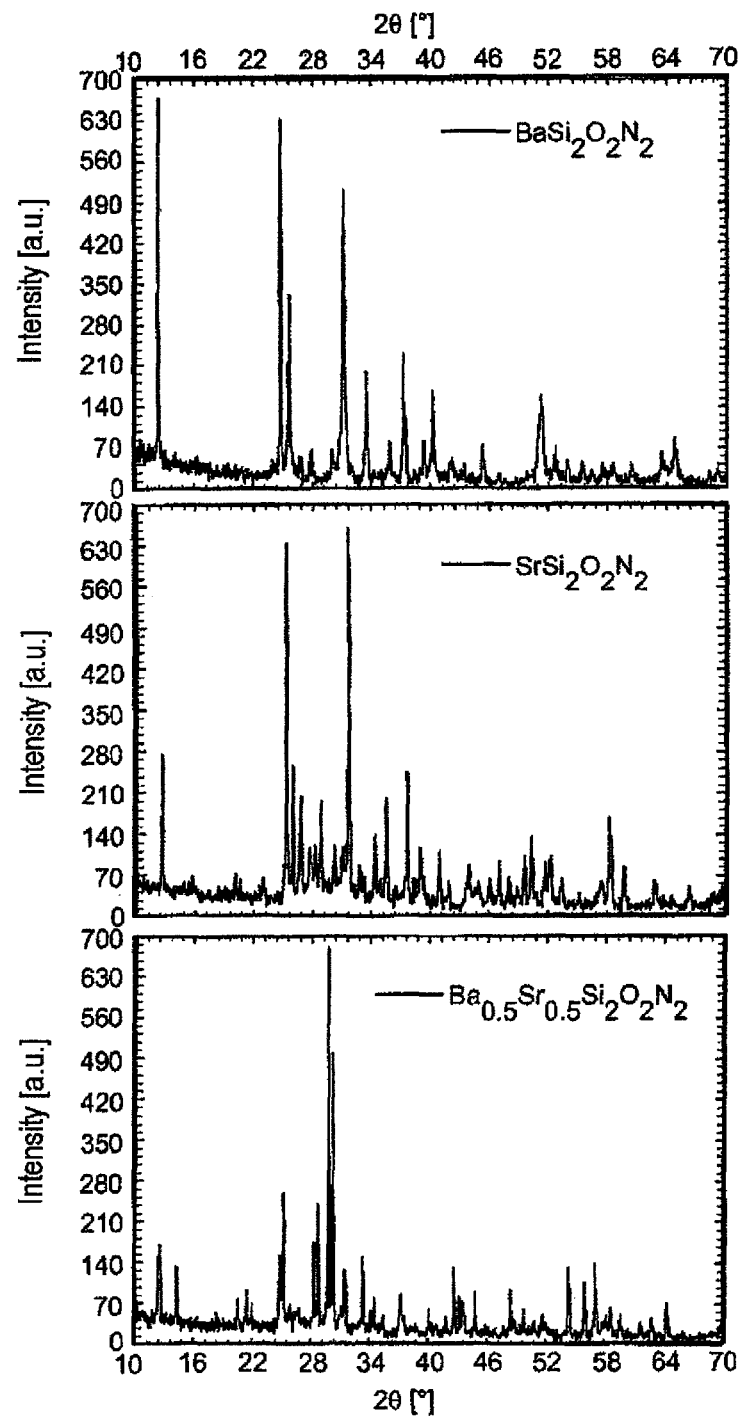
FIG. 1 shows diffractograms of various sions of the type MSi2O2N2:Eu.

FIG. 1 shows X-ray powder diffractograms of Eu-doped phosphors of the type Ba0.95Si2N2O2:Eu0.05 (top), Sr0.9Si2N2O2:Eu0.1 (bottom) and Ba0.45Sr0.45Si2N2O2:Eu0.1 (center). It can be seen that the diffractograms differ markedly from one another. The diffractogram of Sr sion still contains the peaks of the diffractogram of Ba sion (slightly shifted as a result of smaller lattice parameters), but has more lines. This would indicate a structure with a low degree of symmetry. The reflection pattern of BaSr sion is markedly different from that of the two marginal phases, i.e. there is no mixing of the two pure marginal phases.

Figure 2:
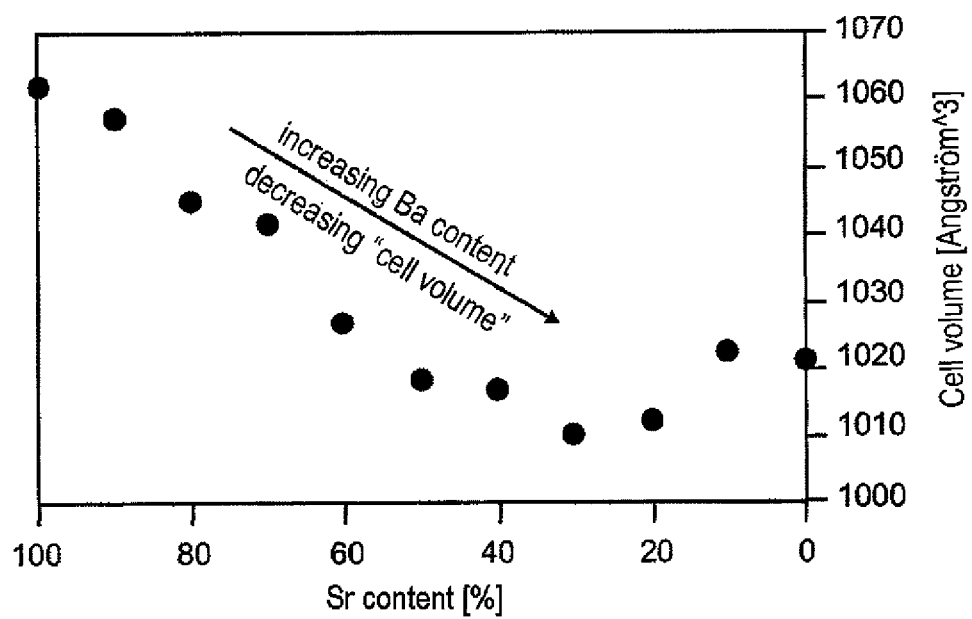
FIG. 2 shows the cell volume as a function of the Sr content.

FIG. 2 shows the cell volume of the phosphor as a function of the Sr content in the Sr—Ba system, produced via the carbonate route. In this case, an orthorhombic unit cell has been assumed. The matching of the lattice parameters to the measured diffractograms under the assumption of an orthorhombic unit cell provides unusual results. It can be seen that the apparent "cell volume" surprisingly markedly decreases initially as the Ba content increases, although with Ba$^{2+}$ a larger cation is incorporated to an increased extent. In the region of from 20% to 50% of Sr, the apparent "cell volume" barely changes; then, it increases again. This would indicate that the cell thus selected does not correspond to the physically real unit cell. Nevertheless, it can be concluded from the peak shift that there are three regions which are markedly different from one another. 0-10% Sr, approximately 20-65% Sr and 70%-100% Sr. Transition regions are at 10 to 20% Sr and 65 to 70% Sr.

Figure 3:
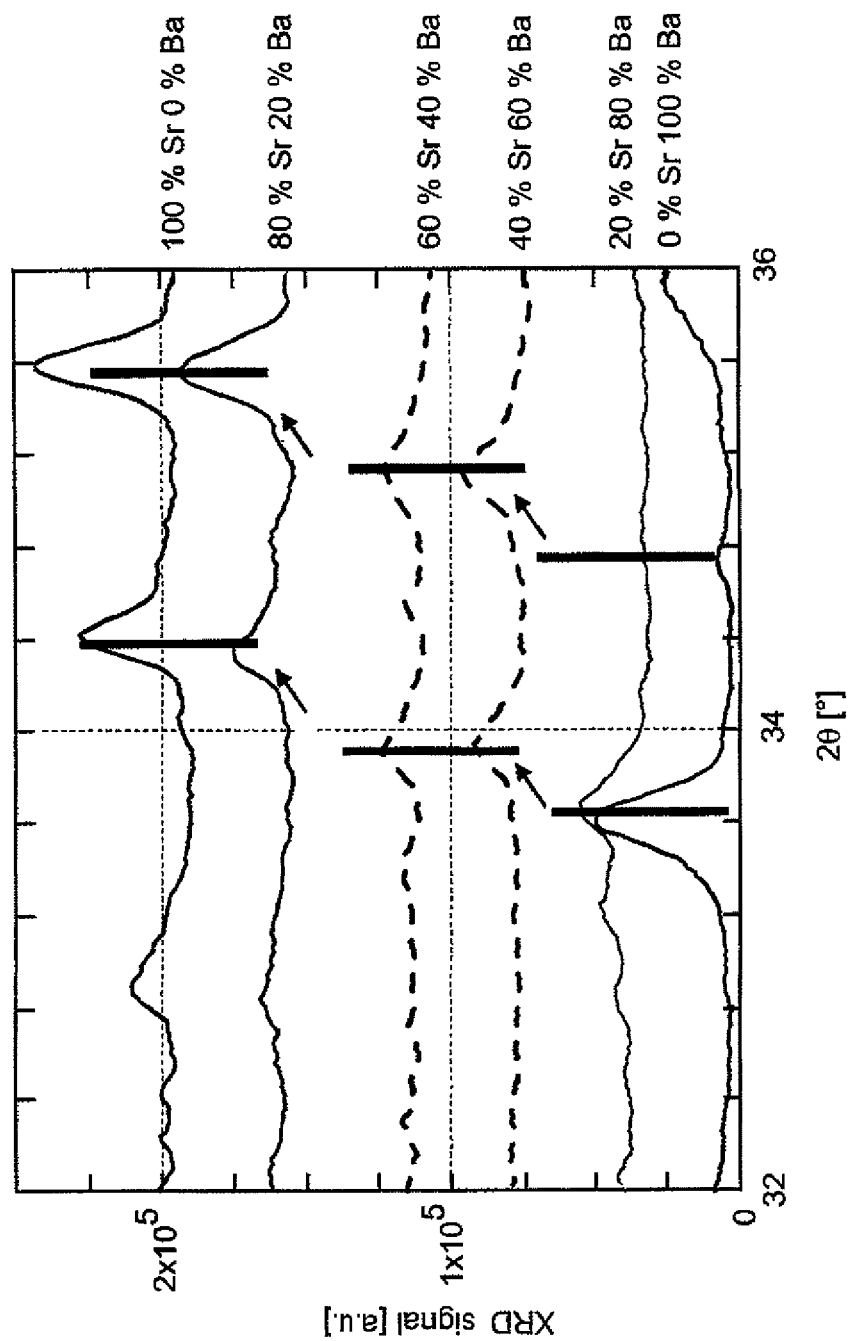
FIGS. 3, 4 each show a detail of the X-ray diffractogram of various mixed sions.

FIG. 3 shows a detail of the X-ray diffraction diffractogram for various mixed sions in the range of from 32 to 36° for the angle 2 θ. The figure shows an overview of six samples with a different Sr/Ba ratio. The Ba content increases from the bottom up from diffractogram to diffractogram in each case by 20% (the Eu content of 2% was distributed uniformly between the two "sites"). The spectra are represented spread apart in the following figures with respect to the angle range in order to be able to discuss the differences better. The labeled reflection groups remain at virtually the same position within a structure as the Sr content increases. However, a sudden change in the position and intensity is demonstrated twice at the phase transitions of Ba sion to SrBa sion and from SrBa sion to Sr sion. Typically, from approximately 35% of Sr, a new, yellow-emitting SrBa sion phase is obtained which is increasingly distorted as the Sr content increases above 60% of Sr and continuously becomes the Sr sion phase. The precise values depend on the Eu doping and on any additionally incorporated cations (for example Ca, Zn, Mg, Yb).

Figure 4:
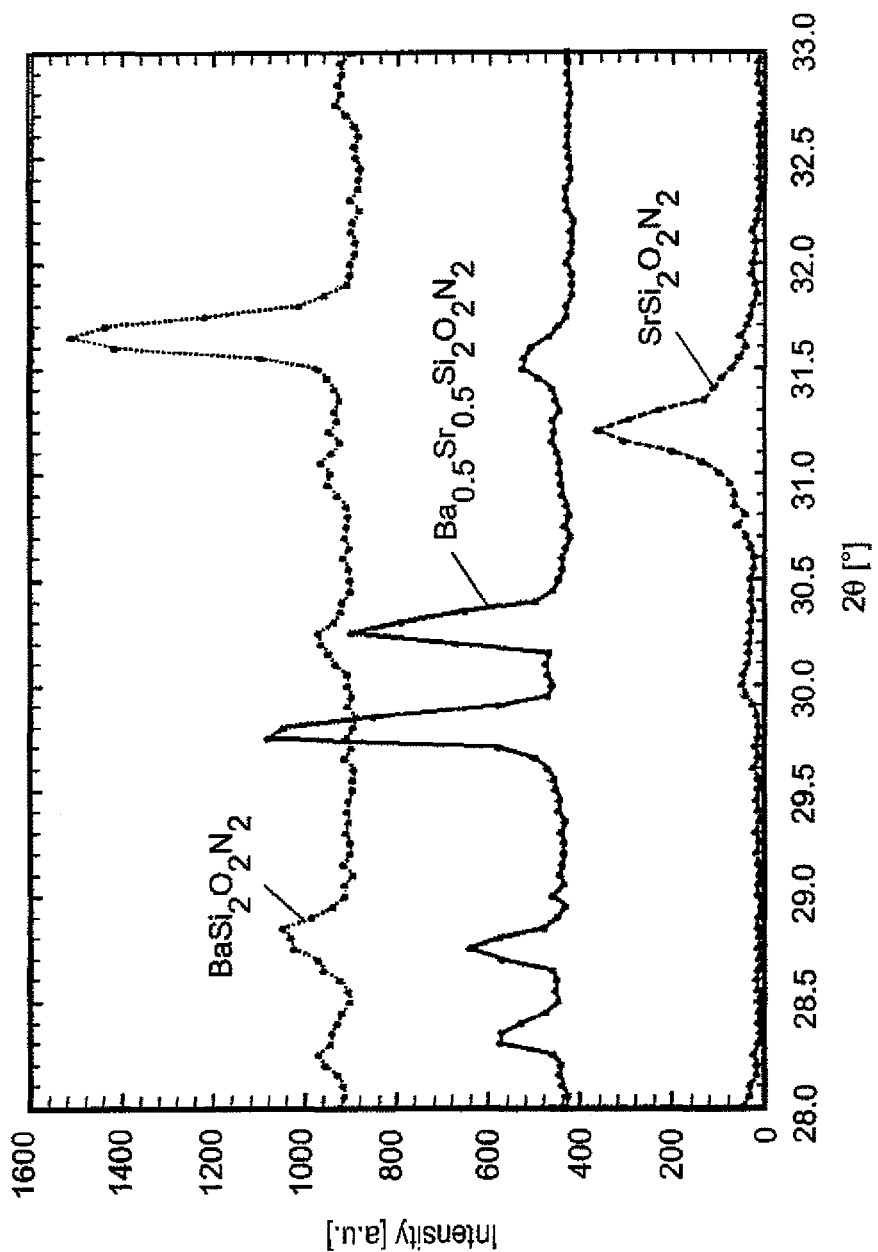

FIG. 4 shows the peak with the greatest intensity of SrBa mixed sion in its position relative to the peak with the greatest intensity of the Sr sion and of the Ba sion. The peak with the greatest intensity of the mixed sion is at approximately 2 θ=31.2°. It is actually a double peak, which coincides in this case as a result of poor resolution. On the other hand, the peak with the greatest intensity of the Sr and the Ba sion has become established at markedly higher wavelengths of almost 2 θ=32°.

Figure 5:
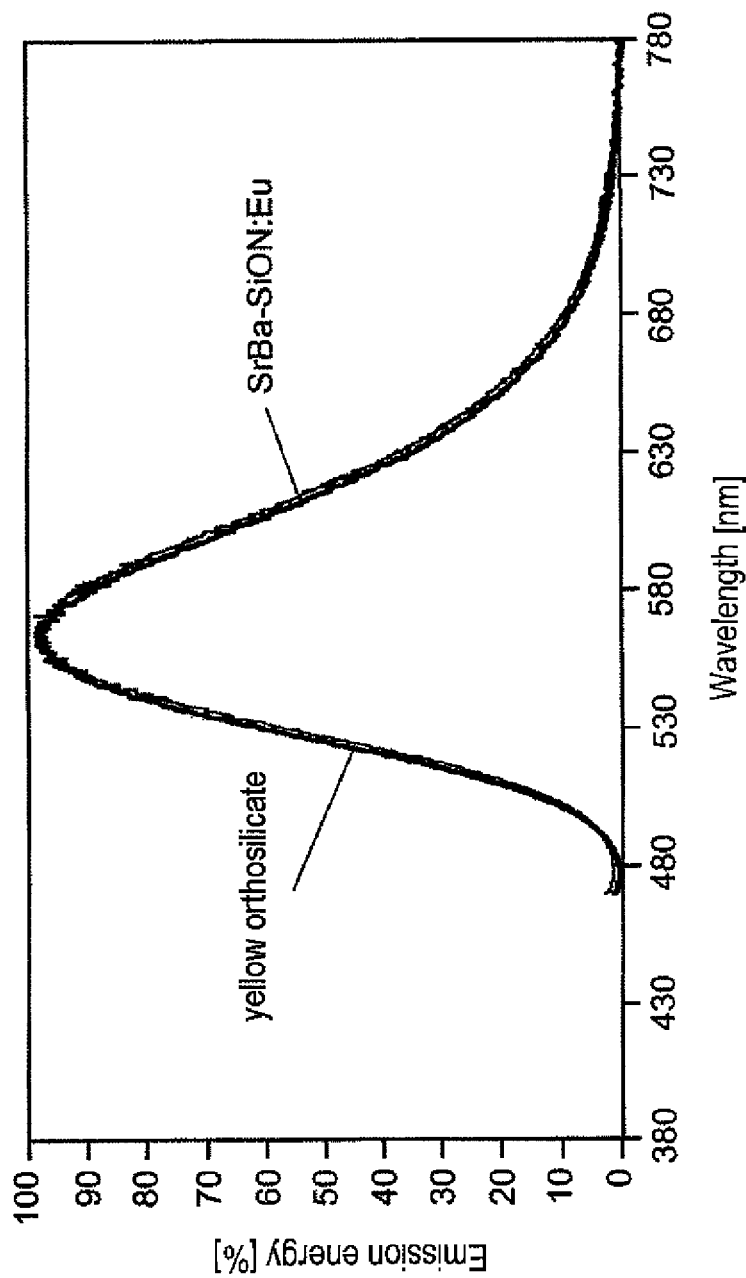
FIG. 5 shows the comparison of the emission of a known orthosilicate with the new mixed sion.

FIG. 5 shows the comparison of the emission band of a phosphor according to the invention of the mixed sion type with a yellow orthosilicate from the prior art. The novel SrBa SiON:Eu makes it possible to achieve virtually the same spectral distribution as with orthosilicates.

Figure 6:
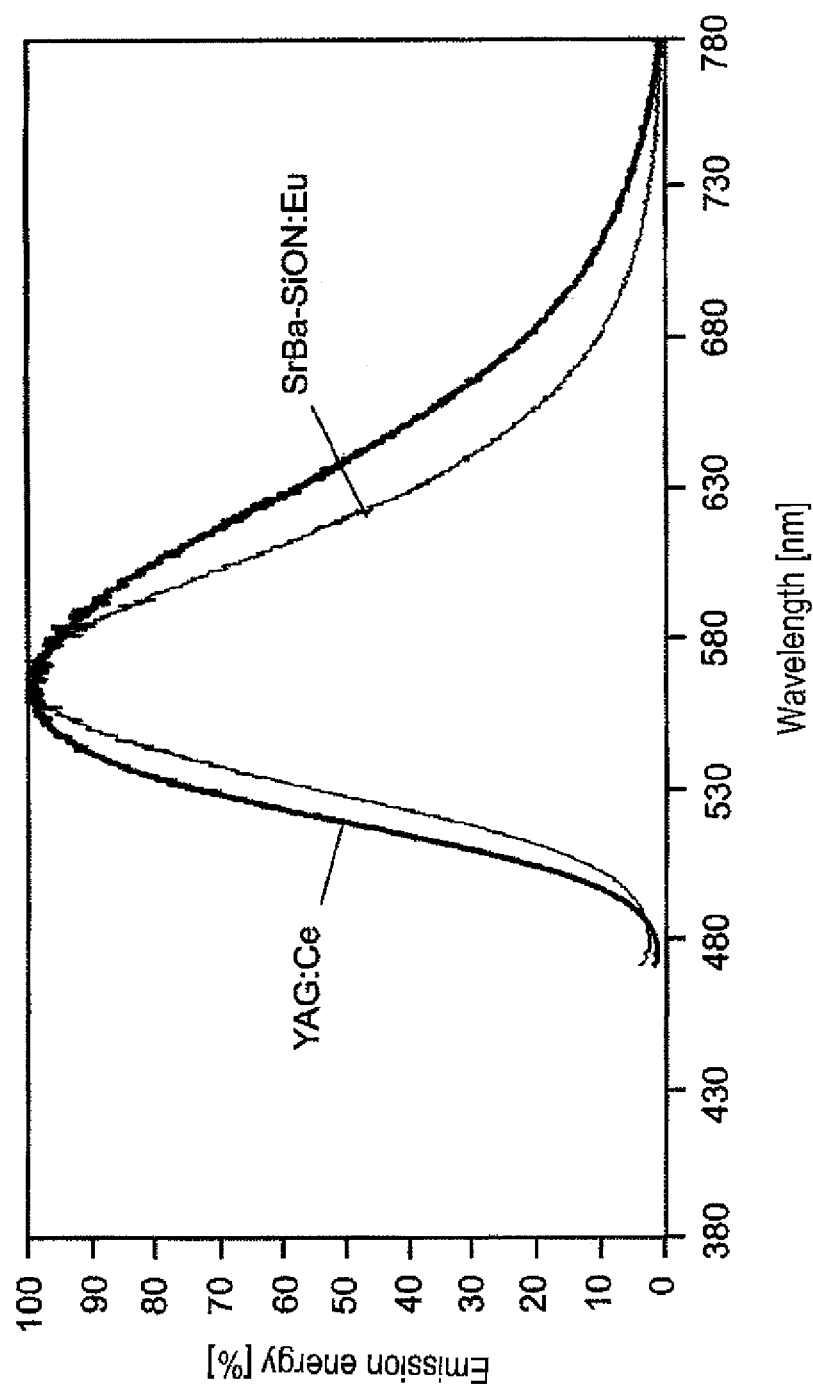
FIG. 6 shows the comparison of the emission of a known garnet with the new mixed sion.

FIG. 6 shows the comparison of the emission band of a phosphor according to the invention of the mixed sion type with a yellow garnet phosphor from the prior art. The emission band is a markedly narrower band given virtually the same dominant wavelength. The useful visual effect of the emission radiation is therefore significantly higher, typically by approximately 10%.

Figure 7:
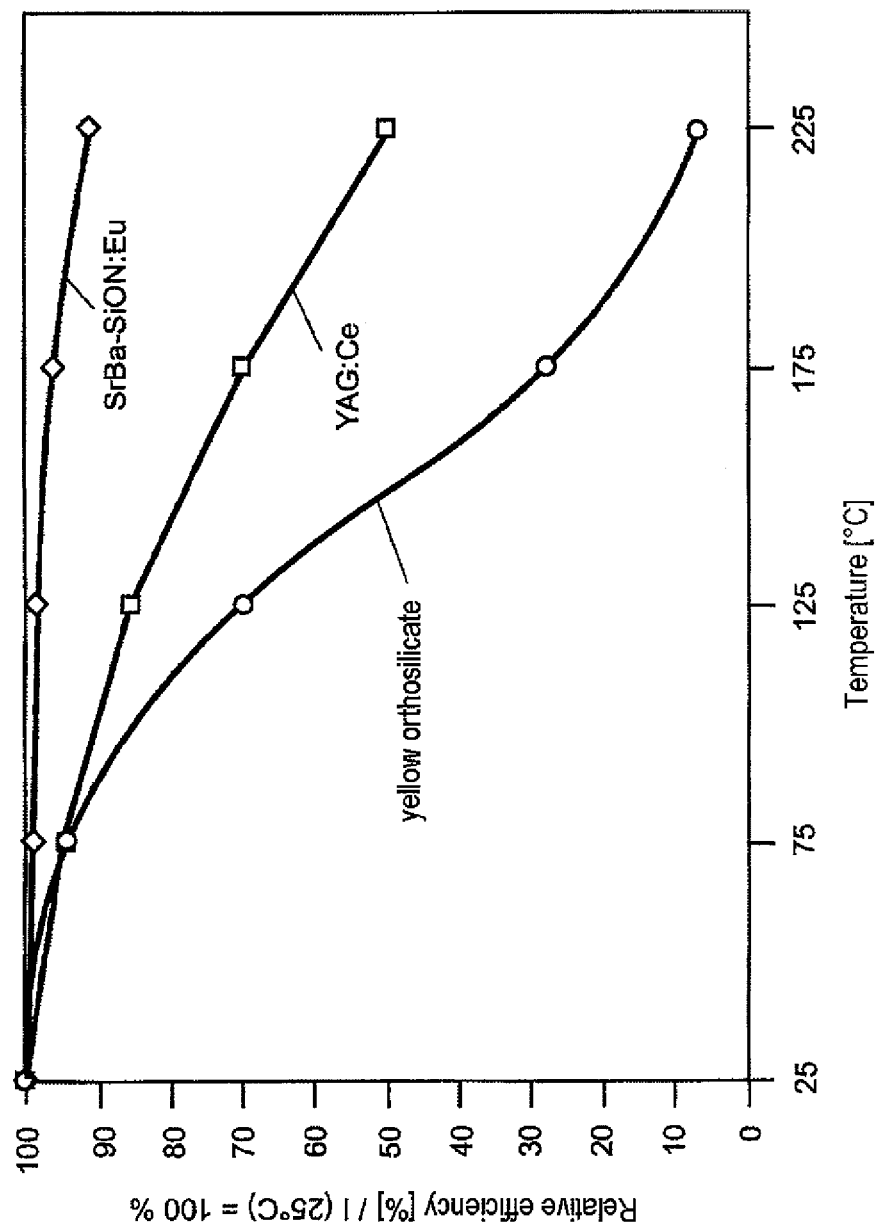
FIG. 7 shows the efficiency of various phosphors as a function of the ambient temperature.

FIG. 7 shows the comparison of the efficiency of the phosphor according to the invention of the mixed sion type with the prior art (YAG:Ce and (Sr, Ba) orthosilicate: Eu) as a function of the ambient temperature. The novel phosphor has a markedly greater thermal stability than the prior art.

Figure 8:
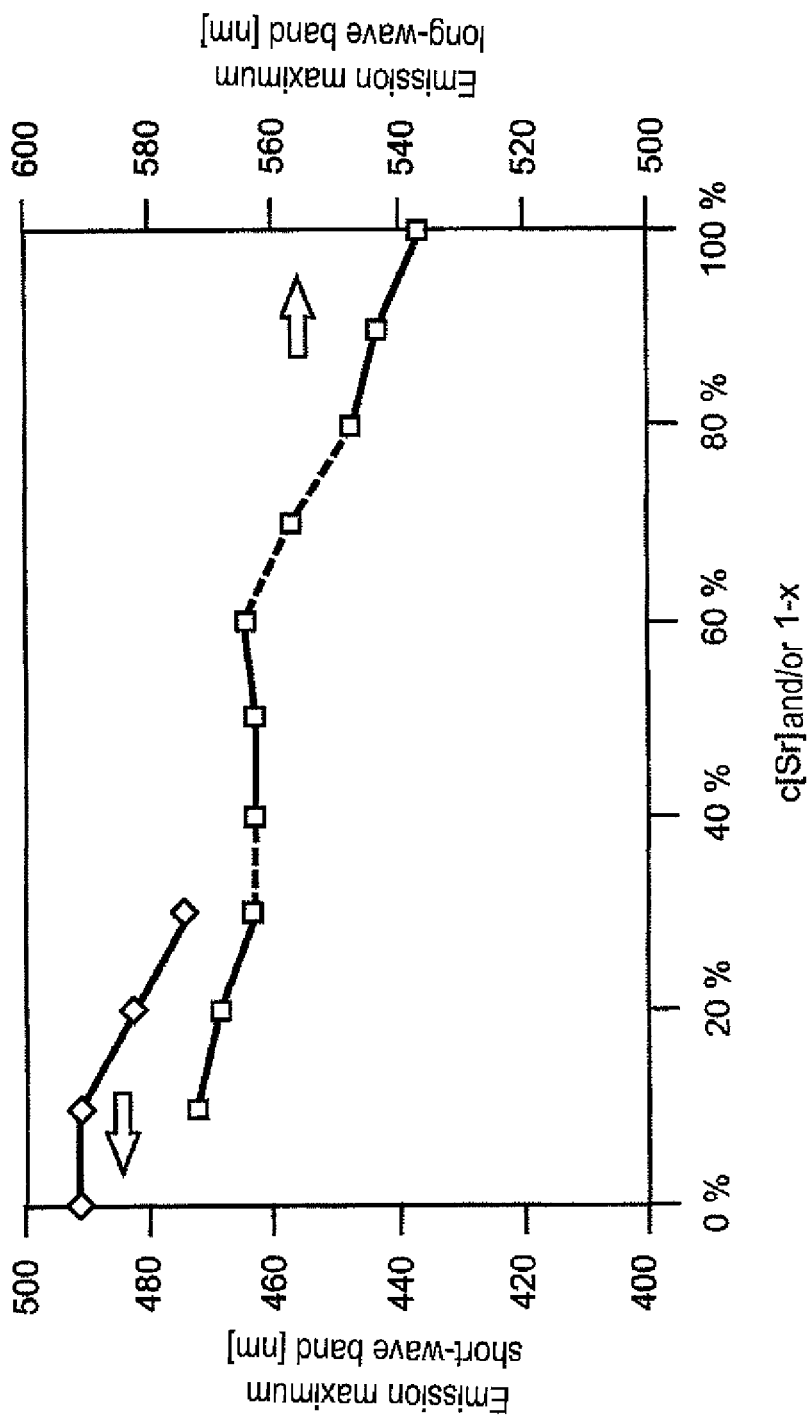
FIG. 8 shows the shift in the emission bands (maximum) as a function of the Sr content.

FIG. 8 shows the comparison of the emission of various mixed sions at a UV excitation with 400 nm. For x up to 30%, a second band is still visible in the blue. High efficiencies are also achieved with blue excitation, typically at 440 to 460 nm, only in the case of compositions in which the blue emission which is observed at 400 nm excitation is largely suppressed. A content f=1-x of (1-x)≥40% is preferred, and (1-x)≥45% is particularly preferred, where in the case of f in each case the Eu content is calculated along with the Sr content, i.e. f=f(Sr, Eu).

FIG. 8 shows the shift in the emission bands of $Ba_xSr_{1-x}Si_2O_2N_2$:Eu(2%) phosphors. The blue emission band disappears virtually completely at 1-x>30%. Between 1-x=30% and 1=x=60%, the position of the long-wave emission band remains virtually constant. The dashed line indicates the phase transition region. A shift in the wavelength in the direction of green Sr SiON:Eu emission can be achieved for relatively high Sr concentratios without the efficiency decreasing. The emission wavelength can therefore be matched easily to the respective requirements. For shorter-wave blue primary LEDs (for example 440-450 nm), for example, a slightly shorter-wave phosphor needs to be used for white generation than in the case of a longer-wave blue primary LED (460 nm peak excitation).

Figure 9:
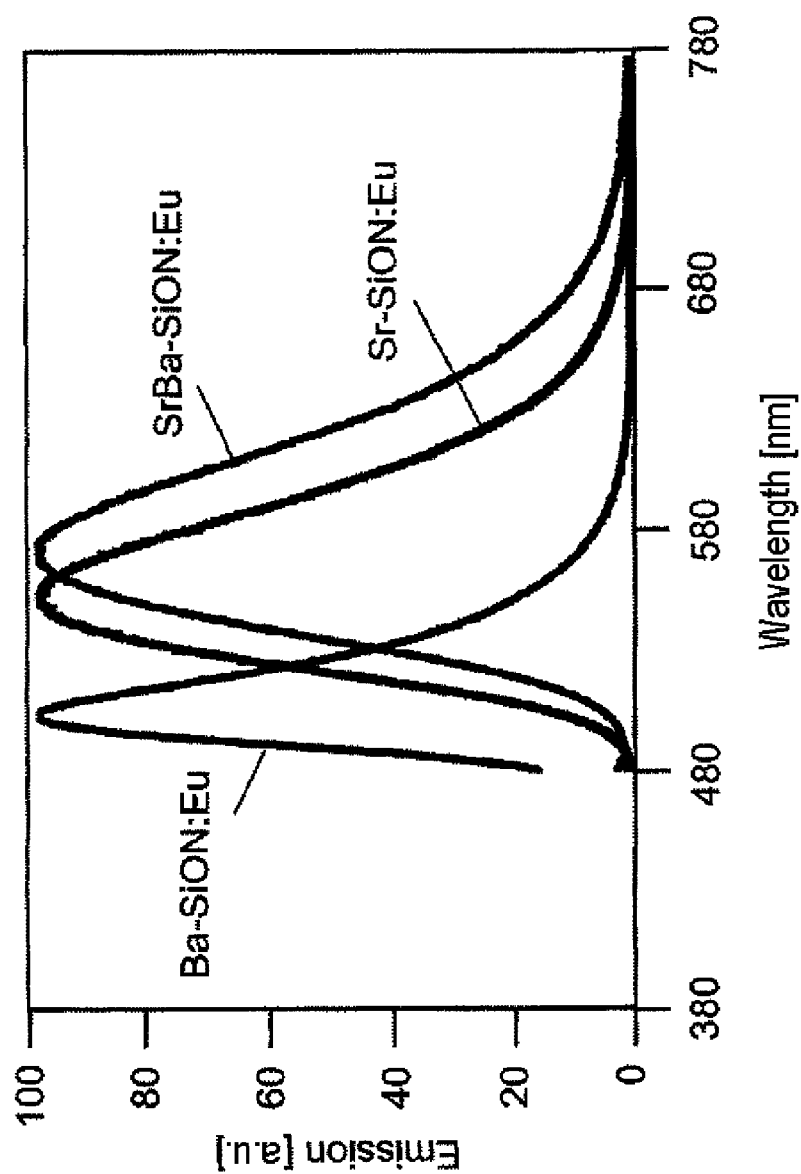
FIG. 9 shows a comparison of the emission spectra of a mixed sion according to the invention with the pure sion.
Figure 10:
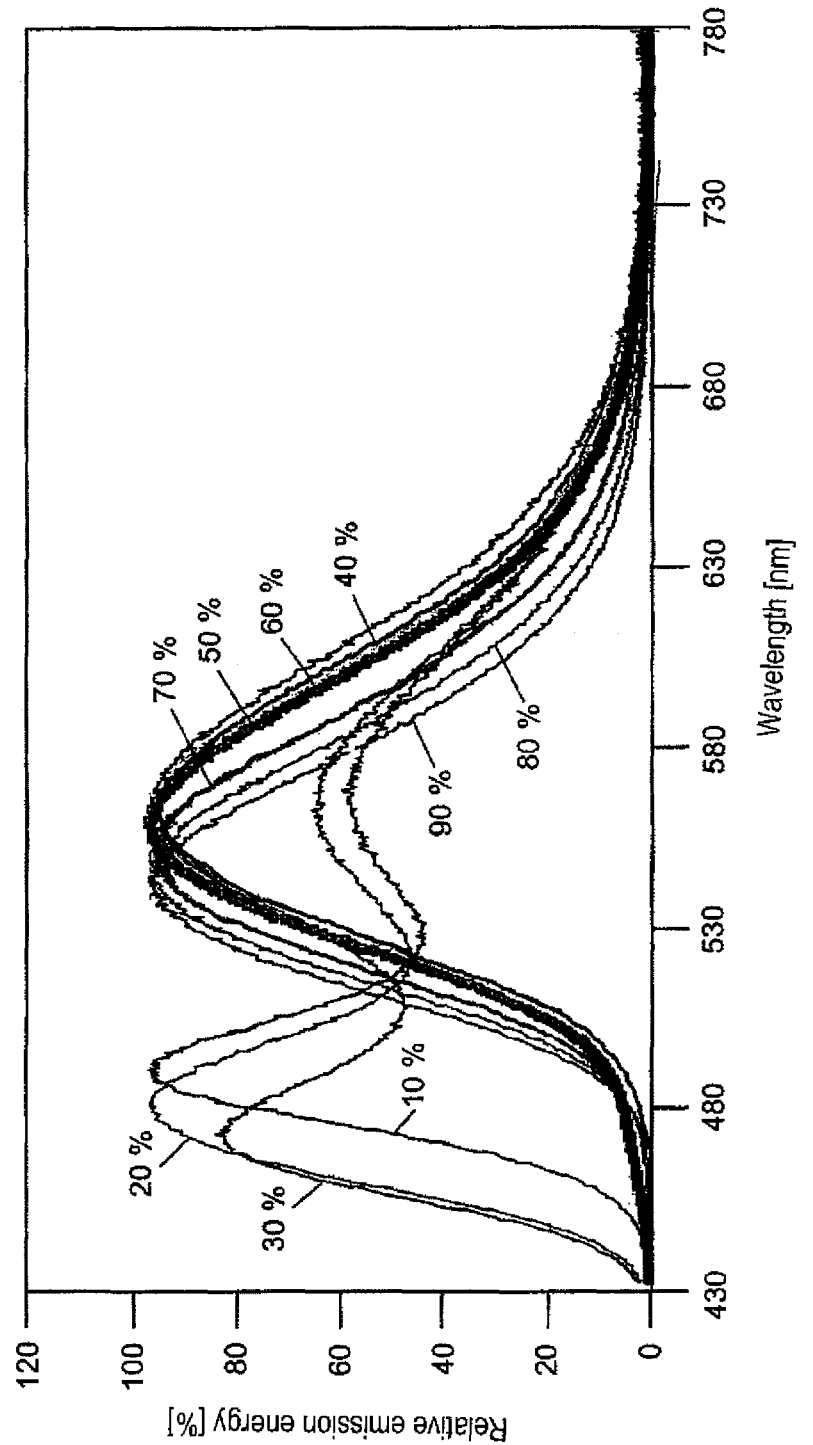
FIG. 10 shows emission spectra of further mixed sions.

FIG. 9: The emission spectrum of the novel mixed sions has a markedly broader band than that of Sr sion. The mixed sion is well suited on its own for color temperatures of around from 4000 to 6500 K, preferably from 4500 to 6000 K.

However, it can also easily be combined together with Sr sion or other sions or nitrides such as (Sr, Ca) Si5N8:Eu or CaAlSiN3:Eu. In particular when using together with Sr sion, the entire emission is therefore shifted continuously, depending on the content, between green (pure Sr SiON:Eu) and yellow (novel mixed sion SrBa SiON:Eu).

In particular the color can therefore be changed. This combination, in connection with a red phosphor, is particularly well suited for warm-white LEDs with a color temperature of from 2800 to 3800 K, with it being possible for a high Ra of at least 85 to be achieved.

In order to match the emission response, a ternary mixed sion based on the Sr—Ba sion can also be used. Suitable for this purpose is in particular Ca in small quantities. Alternatively, another divalent ion with a similarly small ion radius to Ca can also be used. A similarly small ion radius is achieved, in particular when adding Zn, Mg, Mn and Yb instead of or together with Ca. In this case, the contents should be so low that the typical structure of the mixed sion is retained and in particular the double peak at 2θ=31.2° (based on Cu Kα) clearly occurs.

The production of the novel phosphor according to the invention can take place via the orthosilicate route. In this case, first carbonates of Sr and of Ba are mixed intensively together with SiO2 and a flux such as SrF2 or the like and an Eu precursor and homogenized. Then, an orthosilicate is synthesized from this by the mixture being annealed in an $Al_2O_3$ crucible under forming gas. This takes place stepwise over several hours up to a temperature of approximately 1100 to 1400° C. The orthosilicate is then mixed with Si3N4 and homogenized, and this mixture is then annealed in a slightly reducing atmosphere (Ar or N2 or H2 or mixtures) in the tungsten crucible. In this case, the temperature is raised stepwise over several hours up to 1400 to 1600° C.

The production of the novel phosphor according to the invention is also possible via the carbonate route. Advantageously, in this case acidic washing is finally carried out in order to minimize foreign phases. Table 1 shows the production of the mixed sion $Sr_{0.45}Ba0.45Eu_{0.1}Si_2O_2N_2$. In this case, a mean particle size of approximately 1.6 μm is used for the precursors SrCO3 and BaCO3.

The production takes place in such a way that, firstly, the starting materials $SrCO_3$ $BaCO_3$ (or else $BaSrCO_3$), $SrF2$, $Si_3N_4$ and $SiO_2$ are mixed intensively with one another and the mixture is then annealed in the furnace at from 1400 to 1600° C., preferably in a non-oxidic crucible and in particular at least 1500° C., under a slightly reducing atmosphere over 8 hours. In this case, a substantially stoichiometric batch is assumed; see table 1.

Naturally the sion shown does not need to have a precise stoichiometry MSi2O2N2, but only its empirical formula. In this case, discrepancies are also allowed. Such a phosphor can be described as a principally yellow-emitting oxynitride phosphor, with the following stoichiometry:

$$MSi_2O_{2+\delta}N_{2-(2/3)\delta}, \text{ where } M=(Sr_{1-x}Ba_x)_{1-c}Eu_c.$$

For δ, the following is true
1≥δ≥−1, preferably 0.35≥δ≥−0.35.

TABLE 1

| Substance | M (g/mol) | Atomic content | $\frac{1}{1}$ Weighed-in quantity (g) |
|---|---|---|---|
| $SiO_2$ | 60.090 | 0.500 | 30.045 |
| $Si_3N_4$ | 140.283 | 1.500 | 70.142 |
| $SrCO_3$ | 147.630 | 0.450 | 66.434 |
| $BaCO_3$ | 197.339 | 0.450 | 88.803 |
| $SrF_2$ | 125.620 | 0.020 | 2.512 |
| $Eu_2O_3$, 99.99% | 351.920 | 0.100 | 17.596 |
| Total weighed-in quantity | | | 275.53 |

Analysis of the O and N content gives, for example, 14.4 wt. % of O and 10.0 wt. % of N, which nominally corresponds to a δ of +0.29. However, a discrepancy of the measured values from the theory being influenced by foreign phases which are still present to a small degree such as in particular SiO2 and Si2ON2 should not be ruled out, with the result that, specifically, the true value of δ is approximately 0.25 to 0.35. Typically, impurities of less than 200 ppm can also arise as a result of contamination of the starting materials. These low levels of impurities do not fundamentally change the properties of the phosphor, however.

A particularly high quality white LED with a high Ra can be achieved if the yellow mixed sion according to the invention is used together with further phosphors. These should in particular fill the spectrum in the red spectral region. Suitable candidates are in this case in particular red nitrides and red sulfides, as are known per se. Examples are CaAlSiN3:Eu and (Sr, Ca, Zn) S:EU or else (Ba, Sr, Ca)2Si5N8:Eu. In addition, a further sion such as pure Sr sion, which predominantly emits green, can be used for achieving a high Ra.

Table 2 shows the dominant wavelength of pure Sr sion as a function of the europium doping content. This acts as a starting point for the shift which can be achieved by means of the mixed sion, which shift is at least 6 nm, often at least 8 nm, towards longer wavelengths.

Figure 11:
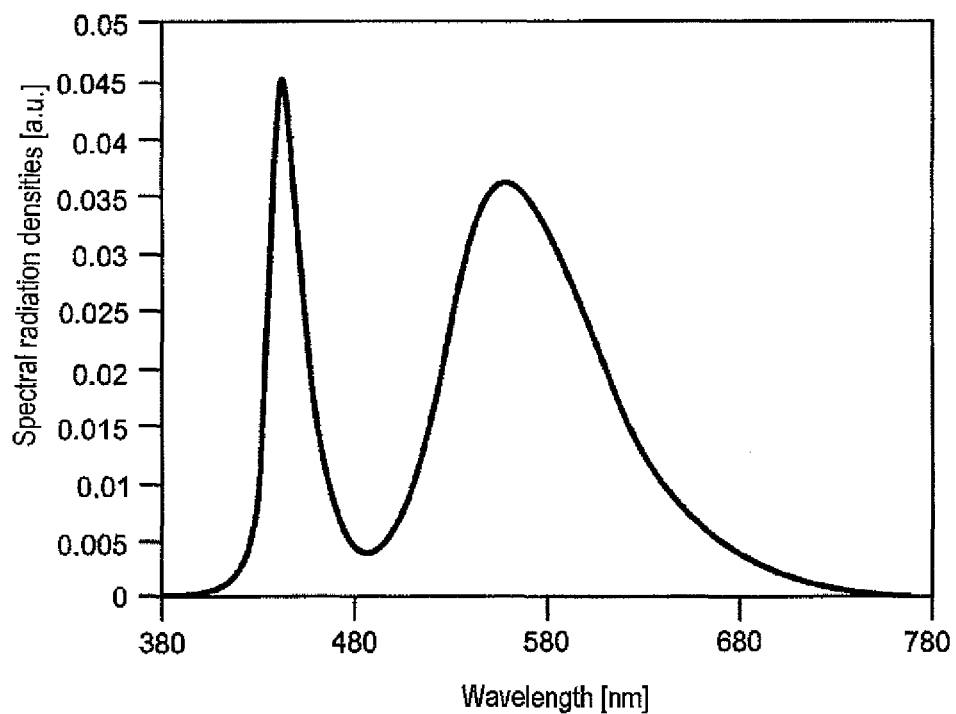
FIG. 11 shows an emission spectrum of a white LED with the concomitant action of the novel phosphor.

Finally, FIG. 11 shows the spectrum of a white LED with a color temperature of 6000 K based on an LED which emits in the blue with a peak wavelength of 460 nm and a yellow-emitting phosphor according to the invention. The two mix together to form white.

Table 3 finally shows a comparison of various data for essential phosphors.

Figure 12:
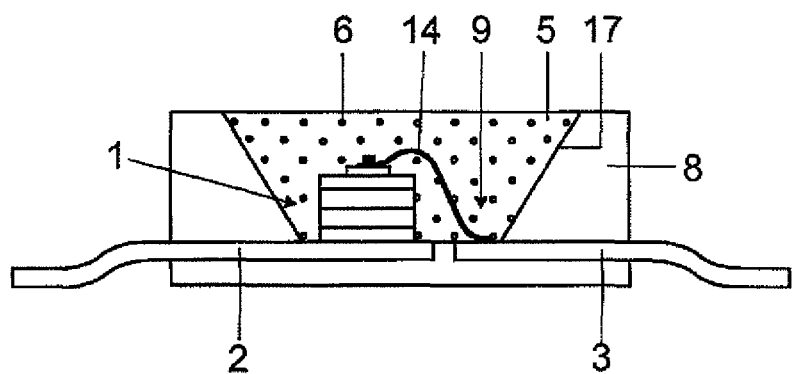
FIG. 12 shows a white LED.

The design of a light source for white light is shown explicitly in FIG. 12. The light source is a semiconductor component with a chip 1 of the type InGaN with a peak emission wavelength in the UV of, for example, 440 nm, which is embedded in a light-impermeable basic housing 8 in the region of a cutout 9. The chip 1 is connected to a first terminal 3 via a bonding wire 14 and directly to a second electrical terminal 2. The cutout 9 is filled with a casting compound 5, which contains an epoxy casting resin (from 80 to 90 wt. %) and phosphor pigments 6 (less than 20 wt. %) as main constituents. Some of the blue primary radiation is absorbed by the yellow-emitting phosphor Sr0, 45Ba0, 45Eu0, 1Si2O2N2, with the result that overall white light is emitted. The cutout has a wall 17, which acts as a reflector for the primary and secondary radiation of the chip 1 or the pigments 6.

Figure 13:
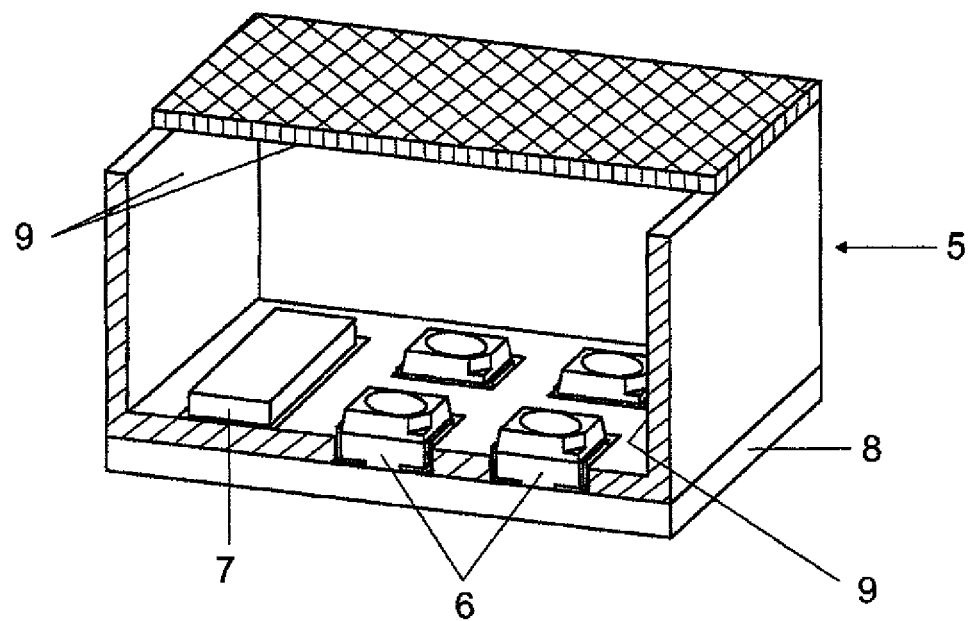
FIG. 13 shows a light source based on LEDs.

In a further exemplary embodiment as shown in FIG. 13, a mixed sion as explained above is again used as the phosphor pigment and a red-emitting nitridosilicate is used, in particular a red-emitting nitridosilicate of the type CaSrSi5N8:Eu. However, these are applied to the walls 9 of an outer housing which contains a plurality of LEDs of the luminescence conversion LEDs type.

Figure 14:
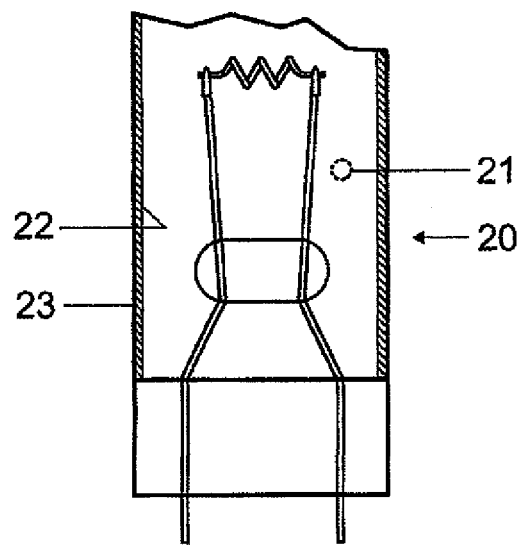
FIG. 14 shows a light source based on a low-pressure lamp.

FIG. 14 shows a low-pressure discharge lamp 20 with a mercury-free gas filling 21 (in schematic form), which contains an indium compound and a buffer gas in a similar way to in WO 02/10374, with a layer 22 of (Sr, Ba)Si$_2$O$_2$N$_2$:Eu on the inside of the bulb 23. The very particular advantage with this arrangement is the fact that this mixed sion is matched easily to the indium radiation because it has substantial contents both in the UV and in the blue spectral region which are easily absorbed by this mixed sion both to an equal extent, which makes it superior over previously known phosphors in terms of its use. These known phosphors absorb notably either only the UV radiation or the blue radiation of the indium, with the result that the indium lamp according to the invention demonstrates a markedly higher efficiency. This statement also applies to an indium lamp based on a high pressure, as is known per se from U.S. Pat. No. 4,810,938.

Figure 15:
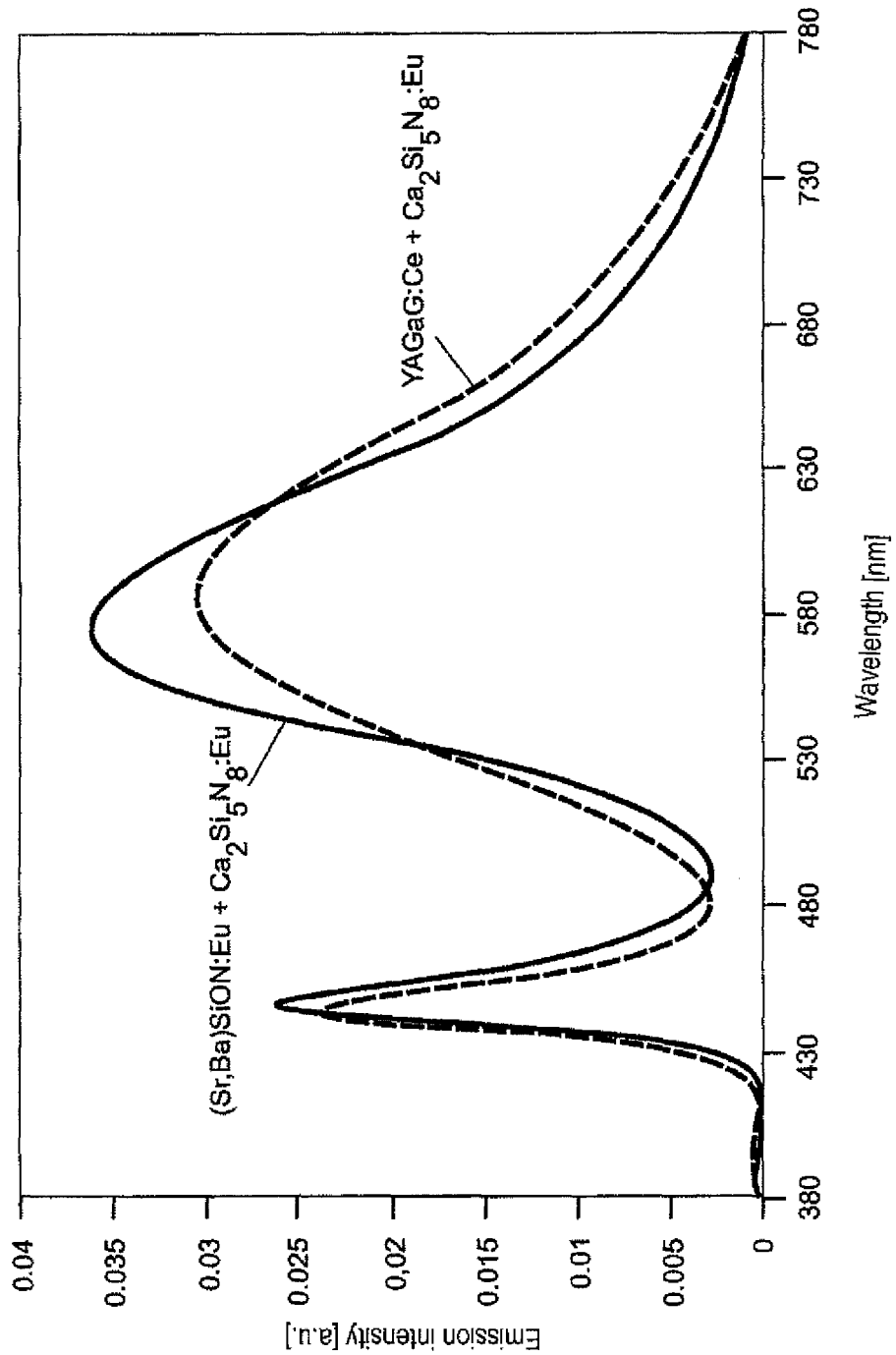
FIG. 15 shows a comparison of the emission of various phosphor systems.

FIG. 15 shows a comparison between two phosphor systems which have a warm white effect. The best system to date is YAGaG:Ce in a mixture with Ca2Si5NB:Eu. YAGaG is intended to mean Y3(A1, Ga) 5O12:C3. The content of the Ca nitride is 9.7 wt. % (33.3%). The disadvantage of the YAGaG is its lack of thermal stability at very high temperatures. In contrast, a mixture of Sr0.5Ba0.5Si2O2N2:Eu with Ca2Si5N8:Eu is more efficient. The content of the Ca nitride is in this case selected as 9.8 wt. % (22.7%). Both the real LED efficiency and the maximum efficiency determined by the useful visual effect, which is 351 lm/W in comparison with 324 lm/W, act as proof of the advantage of the novel mixture.

Table 4 shows the influence of the use of a flux when producing the SrBa sion. The table shows the relative powder brightness of a phosphor sample given the addition of different quantities of the flux (0.01 mol) and its further-treatment at different annealing temperatures. Five different fluxes were used in comparison with a sample without any flux. The annealing temperature was varied between 1400 and 1500° C. It is demonstrated that a different annealing temperature provides better results, depending on the flux.

Table 5 shows the influence of different concentratios of BaF2 as flux. The table shows a series of measurements of between 0 and 0.05 mol of BaF2. It is demonstrated that the annealing temperature for BaF2 should be below 1550° C. and that a different concentratio of BaF2 should be selected depending on the temperature. Overall, it is possible to improve the powder brightness with such a flux.

A similar response is demonstrated when using $SrCl_2$ as flux. It is demonstrated here too that the annealing temperature for $SrCl_2$ should be below 1550° C. and that a different concentration of $SrCl_2$ should be selected depending on the temperature. Overall, it is possible to improve the powder brightness with this flux as well.

TABLE 2

| Eu concentratio c | Dominant wavelength (nm) |
| --- | --- |
| 1% | 554 |
| 2% | 555 |
| 5% | 558 |
| 10% | 563 |
| 20% | 567 |

TABLE 3

| Phosphor | λ_dom [nm] | Vs | Rel. QE at 25° C. | $Q_{th}$ = eff. (175° C.)/ eff. (25° C.) |
| --- | --- | --- | --- | --- |
| $SrSi_2O_2N_2$:Eu | 563 | 0.763 | 96% | 0.91 |
| $Sr_{0.5}Ba_{0.5}Si_2O_2N_2$:Eu | 573 | 0.693 | 100% | 0.96 |
| $BaSi_2O_2N_2$:Eu | 502 | 0.401 | 64% | 0.52 |
| YAG:Ce | 573 | 0.624 | 102% | 0.71 |
| $(Sr,Ba)_2SiO_4$:Eu | 571 | 0.699 | 98% | 0.28 |

TABLE 4

| Relative powder brightness | | Flux (0.01 mol) | | | | |
|---|---|---|---|---|---|---|
| | without | SrF2 | BaF2 | SrCl2 | NH4HF2 | H3BO3 |
| Temperature 1400° C. | 100.0 | 124.9 | 122.4 | 121.2 | 128.0 | 105.8 |
| 1450° C. | 116.1 | 127.0 | 123.6 | 124.6 | 125.2 | 109.0 |
| 1500° C. | 120.9 | 124.8 | 123.0 | 128.0 | 118.8 | 117.3 |

TABLE 5

| Relative powder brightness | | Flux BaF2 (mol) | | |
|---|---|---|---|---|
| | 0 | 0.005 | 0.01 | 0.05 |
| Temperature 1400° C. | 100.0 | 116.9 | 122.4 | 119.0 |
| 1450° C. | 116.1 | 122.9 | 119.0 | 101.8 |
| 1500° C. | 120.9 | 118.1 | 123.0 | 102.9 |
| 1550° C. | 47.8 | 62.4 | 72.3 | 67.4 |

TABLE 6

| Relative powder brightness | | Flux SrCl2 (mol) | | | | |
|---|---|---|---|---|---|---|
| | 0 | 0.01 | 0.02 | 0.03 | 0.04 | 0.05 |
| Temperature 1400° C. | 100.0 | 121.2 | 122.3 | 125.2 | 124.7 | 125.3 |
| 1450° C. | 116.1 | 124.6 | 124.1 | 128.8 | 127.0 | 125.7 |
| 1500° C. | 120.9 | 128.0 | 126.9 | 128.2 | 128.0 | 123.7 |
| 1550° C. | 47.8 | 65.7 | 68.9 | 54.1 | 58.8 | 48.7 |

The invention claimed is:

1. A process of making a high-efficiency phosphor from the class of oxynitridosilicates with a cation $M^{2+}$ and an empirical formula $M_{(1-c)}SiO_2N_2:D_c$, where $M^{2+}$ simultaneously contains as constituents $Sr^{2+}$ and $Ba^{2+}$, and where D is a divalent dopant with at least europium, wherein $Sr_{(1-x)}Ba_x$, where $0.45 \leq x \leq 0.55$, is used for M, the oxynitridosilicate completely or predominantly comprising a mixed sion phase which corresponds neither to that of pure Sr sion phase nor that of pure Ba sion phase, the dominant wavelength of the mixed sion phase with the given doping content being shifted by at least 6 nm, with respect to the dominant wavelength of the pure Sr sion phase with the same doping content towards longer wavelengths, wherein the europium makes up from 5 to 12 mol % of M, wherein the process comprises:
   1) mixing carbonates of Sr and of Ba intensively together with $SiO_2$ and a flux as well as with an Eu precursor,
   2) annealing the mixture obtained in step 1) to synthesize an orthosilicate,
   3) mixing the orthosilicate with a substantially stoichiometric batch of $Si_3N_4$, and
   4) annealing the mixture obtained in step 3) in a slightly reducing atmosphere.

2. The process according to claim 1, wherein the annealing in step 2) is conducted in the presence of forming gas.

3. The process according to claim 1, wherein the annealing in step 2) is conducted in an $Al_2O_3$ crucible in the presence of forming gas.

4. The process according to claim 1, wherein the annealing in step 2) is conducted stepwise for a period of several hours at a temperature of up to approximately 1100-1400° C.

* * * * *